D. MOORE.
Revolver.
No 1,693 Reissued June 7, 1864.
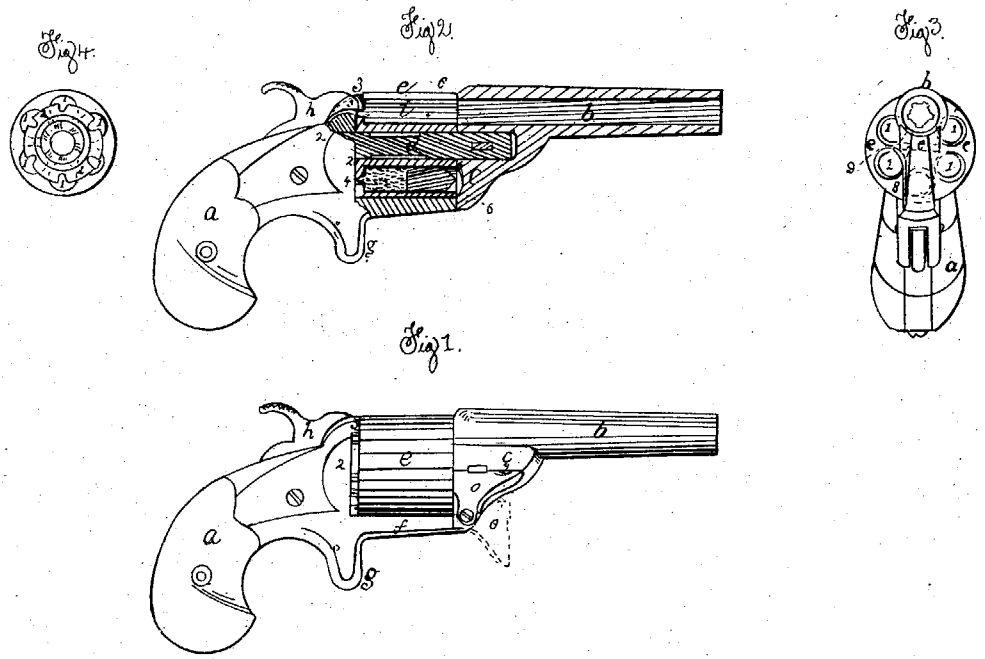
Witnesses
Thos Geo Harold
Chas H Smith
S J Berger
President
M A Buckley Atty P.T.
THE NORRIS PETERS CO., WASHINGTON, D.C.

UNITED STATES PATENT OFFICE.

THE MOORE'S PATENT FIRE-ARMS COMPANY, OF BROOKLYN, NEW YORK, ASSIGNEES OF DANL. MOORE.

IMPROVEMENT IN REVOLVING FIRE-ARMS.

Specification forming part of Letters Patent No. 38,321, dated April 28, 1863; Reissue No. 1,693, dated June 7, 1864.

*To all whom it may concern:*

Be it known that DANIEL MOORE, of Brooklyn, in the county of Kings and State of New York, did invent and make a certain new and useful Improvement in Revolving Fire-Arms, (for which Letters Patent of the United States were duly granted the 28th day of April, 1863, and the entire right therein has been assigned to THE MOORE'S PATENT FIRE-ARMS COMPANY, of Brooklyn aforesaid, as by reference to an instrument recorded in the United States Patent Office, June 1, 1863, in Liber $Y^6$, page 126 of Transfers of Patents will more fully appear;) and the following is hereby declared to be a full, clear, and exact description of the said invention, reference being had to the annexed drawings, making part of this specification, wherein—

Figure 1 is a side elevation of said fire-arm. Fig. 2 is a similar view with the barrel and cylinder in section. Fig. 3 is an end view; and Fig. 4 represents the rear end of the cylinder.

Similar marks of reference denote the same parts.

The nature of this division of the said invention consists in a revolving cylinder with chambers receiving metallic cartridges introduced at the forward end of the cylinder, said cylinder being turned off at the rear end, so as to make an opening into each of the chambers and form a ring or circular-shaped abutment at the rear of the cylinder, upon which the teat of the metallic cartridge can be exploded, and, in combination therewith, of a fixed abutment, which covers the partial opening at the rear of the chamber on the line of the barrel, so as to sustain the explosion in firing the piece; but the chambers not on line with the barrel are sufficiently open at the rear end for the introduction of a small ramrod or other device for forcing out the exploded cartridge-case.

In the drawings, *a* is the handle, of any usual character or shape. *b* is the barrel, rifled or plain. *c* is the bracket of the barrel, receiving the center-pin *d*, on which the cylinder *e* revolves. *f* is the arm extending from the handle *a* to the bracket *c*. *g* is the trigger, and *h* the hammer.

The means for rotating the cylinder, the stop to the same, or the construction of the lock form no part of the present invention, as they may be made and act in any usual manner.

The cylinder *e* is formed with chambers 1 1, that do not pass entirely through but terminate at an abutment, 2, Figs. 1 and 4, at the rear end of the cylinder, which abutment leaves about one-half of the chamber open at the rear end, and this abutment 2, being circular, revolves, with the cylinder *e*, beneath an abutment, 3, projecting from the handle, which abutments 2 and 3 sustain the base of the metallic cartridge-case, when exploded, on the line of the barrel; but the abutment 3 does not extend all around, so that the rear ends of the chambers are partially open for the introduction of a rammer to press out an exploded case, or for observing whether the chamber is loaded or not, and to allow for the removal of dirt from the chamber.

The metallic cartridge-case *i* is formed with a teat or hollow projection, 4, at the center of its base, entering a notch or hole in the abutment 2, and this teat is to be filled with fulminating material and varnished over, or a small piece of paper introduced to keep the gunpowder from contact therewith, and the hammer *h* is formed with a projecting point, 5, that passes through a mortise in the abutment 3 and strikes upon the side of this teat 4 and explodes the fulminate by the compression of the teat against the side of the abutment 2.

In place of the hammer being formed with a point it may strike upon a small spring-punch which shall act against the side of the teat.

The forward end of each chamber 1 is recessed to receive the flange or ring 6 around the forward end of the metal cartridge-case, and this flange or ring being larger than the caliber of the barrel, the said case cannot slide forward and become obstructed in the rear end of the barrel, as would sometimes be the case were the metallic case used without this ring or flange.

In order to introduce or withdraw the cartridge-cases, the side of the bracket *c* is recessed, as at 7, which allows free access to one chamber at a time. In this recess the swinging gate *o* is introduced on the center 8. When the same is turned back, as shown by dotted lines in Fig. 1, a cartridge-case can be entered or withdrawn; but when the same is turned up into the recess the end of the gate keeps the cartridges from falling out. A small projection springing into a notch keeps this gate in position when turned up, and a thumb-piece, 9, allows for its being pressed down out of the way, when desired.

A cartridge entered from the front into the chamber is not claimed, nor a teat or projection on such case, nor a flange around the forward end of the case; but

What is claimed as the invention of the said DANIEL MOORE, and to be secured by Letters Patent, is—

1. Constructing the revolving chambered cylinder of a fire-arm with the rear portion of such cylinder turned off to form a ring and produce an opening into the rear end of each chamber, through which access is afforded for pushing the exploded cartridge-case out at the front end of the chamber, as specified.

2. The circular abutment 2 at the rear end of the cylinder, partially closing the chambers, in combination with a fixed abutment, 3, projecting from the stock and covering the open portion at the rear end of the chamber on line with the barrel, as set forth.

Dated this 18th day of April, A. D. 1864.

A. J. BERGEN,
*President.*
H. N. BRUSH,
*Secretary pro tem.*

Witnesses:
G. W. WHITE,
LEMUEL W. SERRELL.